(12) United States Patent
Takida et al.

(10) Patent No.: US 6,618,575 B2
(45) Date of Patent: Sep. 9, 2003

(54) AUTOMATIC DOCUMENT FEEDER WITH A CONVEYING ROLLER AND AN IMAGE READER

(75) Inventors: Norio Takida, Shizuoka (JP); Takao Imamura, Tokyo (JP); Naoki Shoji, Kanagawa (JP); Seiji Iino, Kanagawa (JP); Mizuho Shirakura, Yamanashi (JP); Kunihide Suzuki, Yamanashi (JP); Ryuta Komatsu, Yamanashi (JP)

(73) Assignees: Nisca Corporation, Minamikoma-gun (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/813,999

(22) Filed: Mar. 22, 2001

(65) Prior Publication Data

US 2001/0033761 A1 Oct. 25, 2001

(30) Foreign Application Priority Data

Apr. 20, 2000 (JP) ........................................ 2000-119679
Apr. 20, 2000 (JP) ........................................ 2000-119684

(51) Int. Cl.[7] .............................................. G03G 15/00
(52) U.S. Cl. ........................ 399/367; 399/371; 399/372
(58) Field of Search ................................ 399/365, 367, 399/368, 369, 370, 371, 372, 377, 379; 271/3.01, 3.05, 4.01, 4.08, 4.09, 4.1, 10.01, 10.09, 10.1, 10.11, 10.12

(56) References Cited

U.S. PATENT DOCUMENTS 5,819,152 A * 10/1998 Kobayashi ................. 399/367
5,887,865 A * 3/1999 Ishimaru ..................... 271/4.7
5,926,681 A * 7/1999 Ishimaru ..................... 399/367
6,076,822 A * 6/2000 Baba et al. ............... 271/10.09
6,151,478 A * 11/2000 Katsuta et al. .............. 399/372

FOREIGN PATENT DOCUMENTS

JP        8-133551      5/1996
JP        10-139211     5/1998

* cited by examiner

Primary Examiner—Hoan Tran
(74) Attorney, Agent, or Firm—Armstrong, Westerman & Hattori, LLP

(57) ABSTRACT

An automatic document feeder of the invention has a conveying roller for conveying a document sheet to a document reading position on a platen facing a document image reading portion. The automatic document feeder contains a pickup guide for picking up the fore end of a document sheet scanned at the document reading position and a pressing piece for pressing a document sheet being conveyed against the pickup guide at a curved portion provided by the platen and the pickup guide. The pressing piece is fixed at an upstream side of the document reading position, extending from the fixed position across the document reading position and is made free at a downstream portion. Further, this document feeder is provided with a document sheet deflecting device for deflecting a document sheet toward a paper discharge stacker. The document deflecting device is a plate spring being capable of swaying within a specified range.

19 Claims, 8 Drawing Sheets

(a)

(b)

(a)

(b)

AUTOMATIC DOCUMENT FEEDER WITH A CONVEYING ROLLER AND AN IMAGE READER

BACKGROUND OF THE INVENTION

1. Field of the Invention

The present invention relates to an automatic document feeder for conveying consecutively document sheets to a document reading position, said automatic document feeder being used in an image reader for forming an image on a paper sheet such as an electrophotographic copying machine for example.

2. Prior Art

An image reader of an electrophotographic copying machine and the like as described above uses a document sheet conveying device called an automatic document feeder (ADF) so as to automatically draw out and feed one by one a plurality of document sheets to a document reading position.

As disclosed in Japanese Patent Laid-Open Publication No. Hei 8-133,551 for example, such a document sheet conveying mechanism is formed so as to draw out one by one document sheets stacked on a paper feed stacker by means of a document sheet separating mechanism, convey each of them to an information reading position through a paper feed path and, after a document sheet is scanned in order to optically take an image on the document sheet, discharge the scanned document sheet onto a paper discharge stacker through a paper discharge path and a pair of paper discharge rollers arranged in the paper discharge path.

In this case, a paper feed roller for drawing out a document sheet, a pair of conveying rollers for conveying a document sheet drawn out and a pair of discharge rollers are driven by a plurality of driving motors.

On the other hand, an image reader is provided with a scanning means for reading each of document sheets one by one conveyed to a document reading position by an automatic document feeder. This scanning means includes a means of irradiating a document sheet passing on a platen with light, collecting the reflected light by means of a collective lens and detecting it by means of a CCD linear sensor, a means of irradiating a document sheet passing on a platen with light and detecting directly the reflected light by means of a contact sensor without collecting the reflected light, and the like.

By the way, in case of scanning a document sheet being conveyed by means of such a scanning means, there is a problem that a read image is distorted when the document sheet flaps at an actual reading position. As disclosed in Japanese Patent Laid-Open Publication No. Hei 10-139,211 for example, therefore, there is known a technique for smoothly feeding a document sheet into a gap (a document reading position) between a platen and a sheet holding member.

That is to say, this publicly known technique arranges a pair of upper and lower plate-shaped elastic pieces at the upstream side of a document reading position, guides a document sheet as putting it between these elastic pieces and thereby feeds the document sheet to the document reading position on a stable track without varying its attitude.

However a general automatic document feeder is provided with a guide for picking up the fore end of a read document sheet and guiding it to a paper discharge slacker side (hereinafter referred to as a "pickup guide"), and has a conveying path being bent (curved) from the reading position toward the paper discharge side.

Due to this, the publicly known technique described above has a problem that a document sheet can be fed smoothly to a reading position but since a document sheet passing the reading position moves through a path being bent (curved) at a pickup guide position, when the fore end of the document sheet strikes this curved part the document sheet flaps at the reading position. Therefore, this technique cannot surely prevent the distortion of a read image and brings a result of obtaining a read image being large in distortion, particularly in case of using a contact sensor as a scanning means.

On the other hand, in a general automatic document feeder, since various rollers are driven by a plurality of driving motors when a document sheet is conveyed, a driving system is complicated and the apparatus is made large-sized and therefore the speed of a reading process becomes slow.

And since a document sheet is discharged by a paper discharge path and a pair of paper discharge rollers arranged in this path, the apparatus is necessarily made large-sized, and thereby in case of consecutively reading document sheets the speed of the reading process is made slower.

Further, since a document sheet is discharged onto a paper discharge stacker through a pair of paper discharge rollers, the state of discharged sheets is not made stable in the direction of discharge and the paper discharge stacker is made large-sized in this direction or a large-sized document sheet is projected from the paper discharge stacker.

The present invention has been performed paying attention to the above problems, and an object of the present invention is to provide an automatic document feeder capable of making the whole apparatus small-sized, simplifying its driving system, improving the speed of reading consecutive document sheets and discharging the document sheets stably onto a paper discharge stacker.

Further, another object of the invention is to provide an automatic document feeder capable of surely preventing an image read in an image reader from being distorted when conveying a document sheet to a document reading position of the image reader.

SUMMARY OF THE INVENTION

In consideration of the above-mentioned problems of the prior art, an automatic document feeder according to the present invention is an automatic document feeder which has a conveying roller for conveying a document sheet, conveys a document sheet to a document reading position on a platen facing a document image reading portion with said document sheet between them and comprises a pickup guide for picking up the fore end of a document sheet scanned at said document reading position from said platen and a pressing piece for pressing a document sheet being conveyed against said pickup guide at a curved part provided by said platen and said pickup guide.

Hereupon, said pressing piece is fixed at the upstream side of said document reading position, extends from said fixed position across the document reading position and is made free at the downstream side. Or the upstream end portion of said pressing piece may be fixed at said document reading position and the downstream end portion of it may extend from the said fixed position across the document reading position and be free in a hanging state.

Said pressing piece is made of a white Mylar member and is made wider in width than the largest document sheet to be conveyed in consideration of handling a thin document sheet.

Further, it is provided with an elastic member so as to make said Mylar member parallel with said curved portion in order to more surely make the document surface of a document sheet close to the document reading portion. As said elastic member, a sponge material or a spring material is used, for example.

Said pressing piece is detachably attached to a frame forming an automatic document feeder or a module guide forming a document sheet conveying path in conjunction with said conveying roller, so that said pressing piece is easily cleaned or maintained. For this purpose, a double-faced adhesive tape is adhered to one end portion of the pressing piece.

According to such a composition as described above, even if a document sheet passing the document reading position is conveyed so as to be curved at a pickup guide provided at the downstream side of the document reading position, since the document sheet is always pressed by the pressing piece, the document sheet does not flap at the document reading position and is not jammed, and an image on the document sheet can be read accurately.

Furthermore, the present invention is to provide an automatic document feeder which has a conveying roller for conveying a document sheet, conveys a document sheet to a document reading position on a platen facing a document image reading portion with said document sheet between them, comprising a pickup guide for picking up the fore end of a document sheet scanned at said document reading position from said platen, a paper discharge means for discharging a document sheet passing said platen onto a paper discharge tray, and a curved path where said document reading portion for reading a conveyed document sheet is located, wherein, said paper discharge means discharges a document sheet onto the paper discharge stacker and a document sheet deflecting means for deflecting a document sheet toward the paper discharge stacker is provided.

And said paper discharge means has a paper discharge roller and said document sheet deflecting means is formed out of a plate spring being swayable. The end portion of said plate spring in the paper discharge direction is curved following the circumferential face of said paper discharge roller. Said plate spring is arranged so that the fore end of a conveyed document sheet strikes it at an acute angle and guides the fore end of a conveyed document sheet in a state where the fore end of the conveyed document sheet is in contact with said plate spring at an acute angle to the nipping part of the paper discharge roller. Said paper discharge roller is supported so that the outer circumferential face of it projects from the rear end stop plate of said paper discharge stacker.

An image reader of the present invention comprises a paper feed stacker and a paper discharge stacker provided at upper and lower positions relative to each other, a curved path which is arranged between these paper feed stacker and paper discharge stacker and through which a document sheet is conveyed, a paper feed means formed in a path for conveying a document sheet, a conveying means, a paper discharge means, and a driving motor for driving these document sheet conveying means, and feeds a document sheet conveyed by said conveying means to a document sheet reading portion, discharges a document sheet read by said document sheet reading portion onto said paper discharge stacker by means of said document sheet discharge means and comprises a document sheet deflecting means for deflecting a document sheet toward the paper discharge stacker.

Said paper feed means provided in said image reader is provided with a resisting roller for removing the skew of a document sheet fed from said paper feed stacker, said conveying means is provided with a feed roller for feeding a document sheet whose skew has been removed to a document sheet reading portion, and said paper discharge means is provided with a paper discharge roller for discharging a document sheet read by the document sheet reading portion onto the paper discharge stacker.

And said resisting roller, feed roller and paper discharge roller are in contact with the outer circumferential face of a single large-diameter roller.

Such a composition as described above makes it possible to drive and control a paper feed means, a conveying means and a paper discharge means in conveyance of a document sheet by means of a single driving motor and thereby simplify the driving system and control system. And since a document sheet read by a document sheet reading portion is discharged in a state of being deflected by a deflecting means, the paper discharge state is made stable.

DESCRIPTION OF THE PREFERRED EMBODIMENTS OF THE INVENTION

Figure 1:
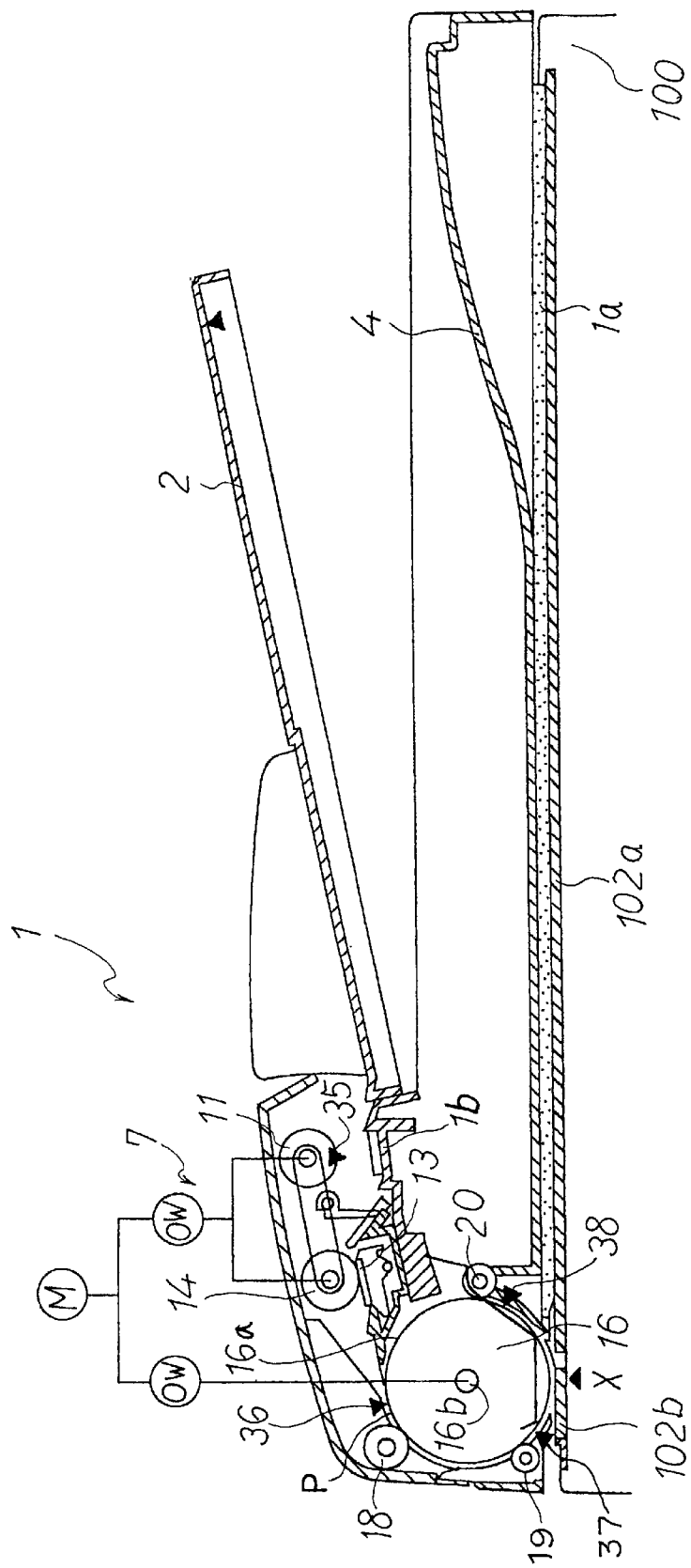
FIG. 1 shows the internal composition of an automatic document feeder (ADF) according to a first embodiment of the present invention.
Figure 2:
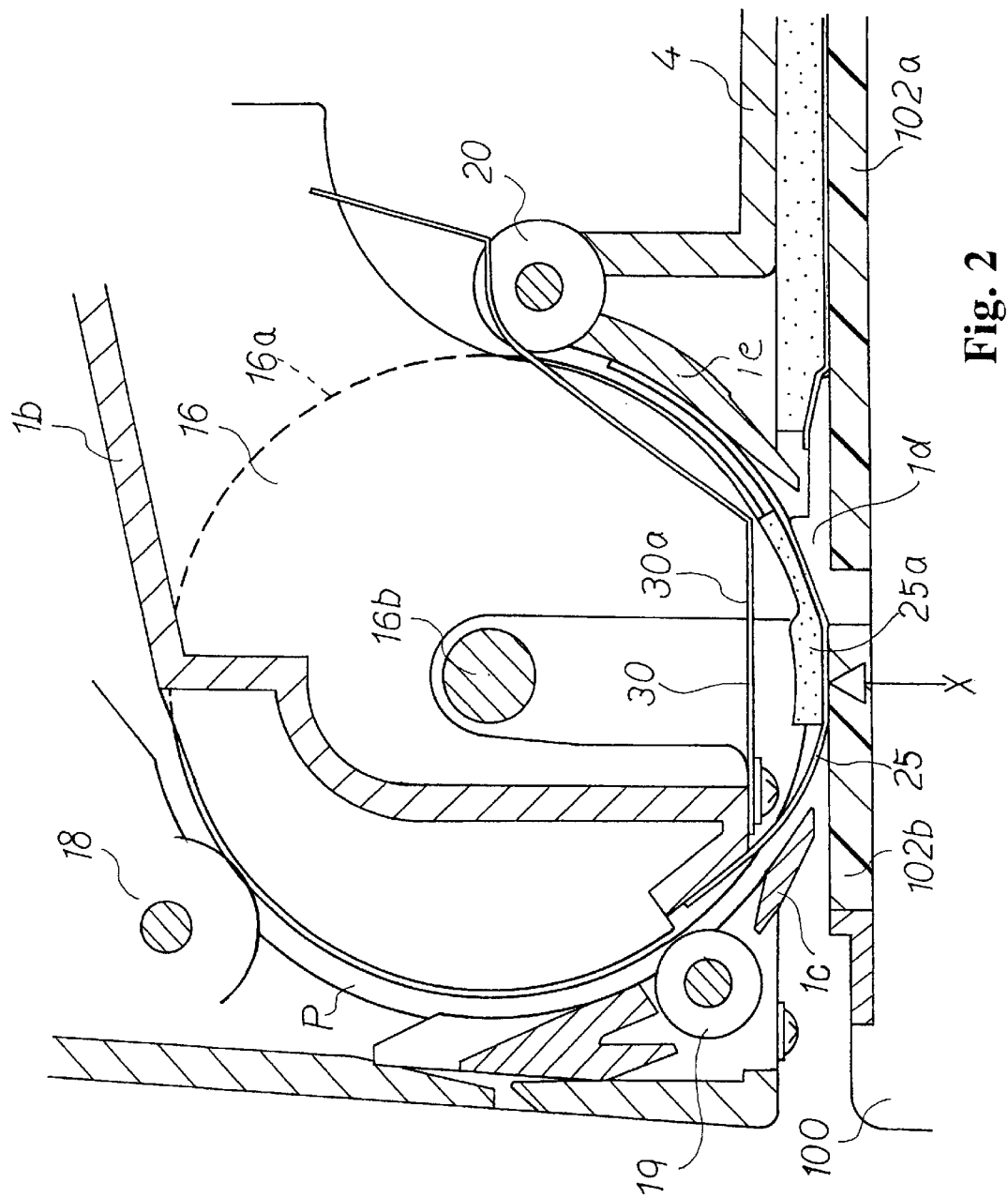
FIG. 2 is a magnified view showing the document reading position of the automatic document feeder shown in FIG. 1.

An automatic document feeder according to the present invention is described in detail with reference to the drawings in the following. FIG. 1 shows the internal composition of an embodiment of an ADF to be mounted on an electrophotographic copying machine, and FIG. 2 shows a magnified view of the document reading position in the said internal composition.

On the top of the body of an electrophotographic copying machine 100, a document holding glass plate (first platen) 102*a* is arranged so as to make it possible to handle a document in the form of a book, and a cover glass plate (second platen) 102*b* over which document sheets conveyed consecutively by an ADF 1 pass is disposed at one side of this platen 102*a*.

A scanning means (not illustrated) for reading a document is arranged below said platens 102*a* and 102*b*. This scanning means includes a means of irradiating a document sheet passing over the platen 102*b* with light, collecting the reflected light by means of a collective lens and detecting it by a CCD linear sensor, a means of irradiating a document sheet passing over the platen 102b with light and detecting directly the reflected light by means of a contact sensor, and the like, in case of reading a document conveyed over the platen 102b by means of the ADF 1.

In case of reading a document in the form of a book, a traveling member (not illustrated) to irradiate the document with light moves within a range of the first platen 102a. And such a scanning means as described above may be assembled into an electrophotographic copying machine 100 or may be assembled as a unit into an ADF 1 in advance.

Said ADF 1 is composed so as to consecutively convey documents to a position X (called a reading position X) where a document on the second platen 102b is read. And the ADF 1 is provided with a pressing plate 1a to bring a document into close contact with the surface of said platen 102a so as to make it possible to handle a document in the form of a book.

The ADF 1 is provided with a paper feed stacker 2 for having a plurality of document sheets stacked on it and a paper discharge stacker 4 onto which a document drawn out from this paper feed stacker 2 and finished in reading its content at the reading position X is discharged. These stackers 2 and 4 are preferably provided at upper and lower positions relative to each other in order to make the main body of a copying machine small-size, and said pressing plate 1a is mounted at the underside of the paper discharge stacker 4. And in this embodiment, on the paper feed stacker 2 document sheets each having its upside as a side to be processed are stacked from the lower side to the upper side in descending order of page and are drawn out one by one from the upper side.

Inside the main body of the apparatus a paper separating mechanism 7 for drawing out one by one document sheets stacked on the paper feed stacker 2 is arranged. The paper separating mechanism 7 is provided with a kick roller 11 for touching document sheets stacked on the paper feed stacker 2 and drawing out a document sheet on the top, a separating pad 13 and a separating roller 14 being in contact with this pad so as to separate one by one document sheets drawn out by the kick roller 11. The kick roller 11 and the separating roller 14 are rotationally driven by a driving motor capable of turning forward and backward through a one-way clutch making them turnable only in one direction.

A conveying path P for conveying curvedly and feeding a drawn-out document sheet to said reading position X is provided at the downstream side of said paper separating mechanism 7. In this embodiment, this curved conveying path P is formed by the outer circumferential face 16a of a large-diameter roller 16 arranged so as to face the reading position X. In this case a plurality of said large-diameter rollers 16 are arranged at specific intervals on a driving shaft 16b rotatably supported by a frame 1b of the main body of the apparatus and are rotationally driven by said driving motor capable of turning forward and backward through a one-way clutch.

A paper feed means, a conveying means and a paper discharge means are provided in this order in the conveying path P. In this embodiment, these conveying points are in contact with the respective outer circumferential faces of a plurality of large-diameter rollers 16 disposed at specific intervals as described above, and are formed out of a resisting roller 18, a feed roller 19 and a paper discharge roller 20 in order from the upstream side. The reading position X is located between the feed roller 19 and the paper discharge roller 20, and a document sheet read at this position is conveyed between the large-diameter roller 16 and the paper discharge roller 20 to be discharged directly onto the paper discharge stacker 4.

Between said feed roller 19 and the reading position X a guide 1c is detachably attached to the frame 1b and guides (feeds) a document sheet conveyed through the conveying path P onto the platen 102b (reading position X). And between the platen 102b and the paper discharge roller 20 a pickup guide 1d is provided and picks up a document read at the reading position X on the platen 102b so that it is bent (curved) and guides it to a nipping part between the large-diameter roller 16 and the paper discharge roller 20.

And on a curved portion provided by said platen 102b and pickup guide 1d, a pressing piece is provided so as to press a conveyed document sheet against the pickup guide 1d.

A pressing piece of this embodiment is formed out of a white Mylar member 25 provided extending over from the upstream side of the reading position X to the downstream between the plurality of large-diameter rollers 16 axially provided at specified intervals and the paper discharge roller 20 being in contact with these rollers 16. This Mylar member 25 is formed out of a polyester film of about 0.1 mm in thickness, and the upstream end portion of it is fixed on the frame 1b above the guide 1c and the downstream end portion of it is free and extends from the upside of the pickup guide 1d along the conveying path P. In this case, the Mylar member 25 can be easily mounted on the frame 1b after detaching the guide 1c by adhering a double-faced adhesive tape to the back of the upstream end portion of the Mylar member 25.

And in this embodiment, a deflecting means for deflecting a document sheet read at the reading position X, concretely, a plate spring 30 supported at one end of it by the frame 1b is located between the plurality of large-diameter rollers 16 axially provided at specified intervals and the paper discharge roller 20 being in contact with these rollers 16.

Said plate spring 30 is formed out of a horizontal portion 30a extending along the platen 102b from the supported part, a inclined portion 30b extending from the horizontal portion upward along the outer circumference of the large-diameter roller 16 and a curved portion 30c being curved following the circumferential face of the paper discharge roller 20 from the inclined portion. According to the plate spring 30 composed in such a way, the fore end of a document sheet read at the reading position X strikes the inclined portion 30b at an acute angle to be turned in a specified range.

The ADF 1 composed as described above is provided with various kinds of sensors for detecting the presence and passage of a document. Concretely, an empty sensor 35 for detecting the presence of a document on the paper feed stacker 2 is provided at the position of drawing out a document, and further a resisting sensor 36, a reading sensor 37 and a paper discharge sensor 38 are arranged respectively on this side of the resisting roller 18, this side of the document processing portion X and this side of the paper discharge roller 20 so as to detect the passage of a document sheet. And these sensors 35 to 38 are connected to a CPU for controlling the driving of the whole apparatus, and said driving motor M is made to turn forward/backward and to stop on the basis of the detection signals of the respective sensors.

Next, a process of consecutively drawing out and processing document sheets by means of an ADF 1 of such a composition as described above is described.

When the on state of the empty sensor 35, namely, a fact that document sheets are stacked on the stacker 2 is detected and the start instruction from the copying machine is received, the driving motor M is driven to turn forward and the first document sheet is fed by the kick roller 11. At this time, even if document sheets are double-fed, the document sheets are surely one by one separated and fed by the separating pad 13 and the separating roller 14 of the separating mechanism, said separating roller being turned in the same direction as the kick roller. The kick roller 11 and the separating roller 14 are driven to turn in the document feed direction, but the large-diameter roller 16 is not turned due to the action of a one-way clutch.

And when the resisting sensor 36 detects a fed document sheet, the driving motor M is stopped temporarily a specified time after this detection. When the driving motor M is stopped, the fore end of the document sheet strikes the nipping part between the large-diameter roller 16 and the resisting roller 18 and the document sheet is bent and thereby is corrected not to skew. And after this temporary stop, the driving motor M is driven to turn backward. At this time, the kick roller 11 and the separating roller 14 are not turned due to the action of the one-way clutch, but the large-diameter roller 16 is driven to turn in the document feed direction.

Due to driving backward the driving motor M, a document sheet is conveyed along the conveying path P, namely, the outer circumference of the large-diameter roller 16 and passes through between the large-diameter roller 16 and the feed roller 19 and thereafter, when the reading sensor 37 detects the passage of the document sheet, the backward driving speed of the driving motor M is lowered. When the large-diameter roller 16 is in a low-speed driven state, the document is vertically scanned and read by said scanning means.

And a specified time after the reading sensor 37 detects the rear end of the document sheet, the driving motor M is driven again to turn forward, feeds the second document sheet, and temporarily stops it and bends it by the resisting roller 18 like the first document sheet and thereby removes the skew of it. When the second document sheet is fed, the fore end of the first document sheet is placed already on the paper discharge stacker 4 and the rear end is in a state of being held between the large-diameter roller 16 and the paper discharge roller 20.

And the driving motor M being at a temporary stop is driven again to turn backward. At this time, the large-diameter roller 16 is driven to turn in the document feed direction, the first document sheet is discharged through the paper discharge roller 20 being the third conveying point, the second document sheet is conveyed along the conveying path P, and a reading operation is performed in the same way as described above. And in such a consecutive processing operation, when the empty sensor 35 detects no existence of a document, a specified time after the paper discharge sensor 38 detects the rear end of a document sheet the backward driving of the driving motor M is stopped and a series of consecutive document conveying processes are ended.

As described above, when a preceding document sheet is shifted from a reading operation to a discharging operation, the next document sheet is drawn out and therefore the interval between the consecutive processes can be shortened. And since a series of processes of "feeding and reading the preceding document"->"drawing out the next document"->"discharging the preceding document and feeding the next document" are performed only by turning forward and backward a single driving motor M, the control is simplified. Further, since a document sheet being read is conveyed by the three conveying points, the processing speed is improved and the composition of the driving system is simplified and the apparatus is reduced in cost.

Figure 3:
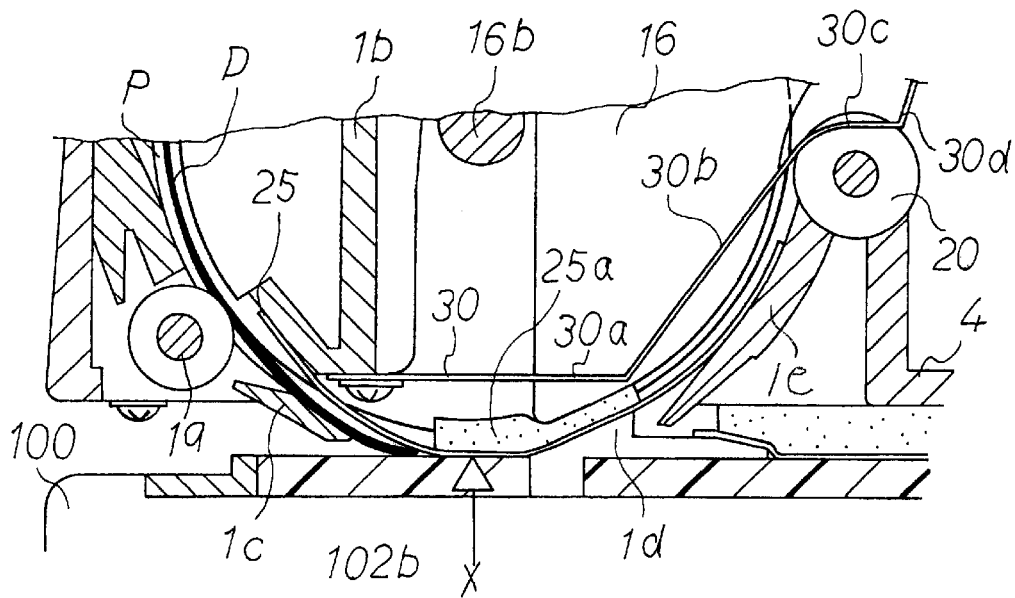
FIG. 3 shows a state of conveying a document sheet at the document reading position of this automatic document feeder.
Figure 3:
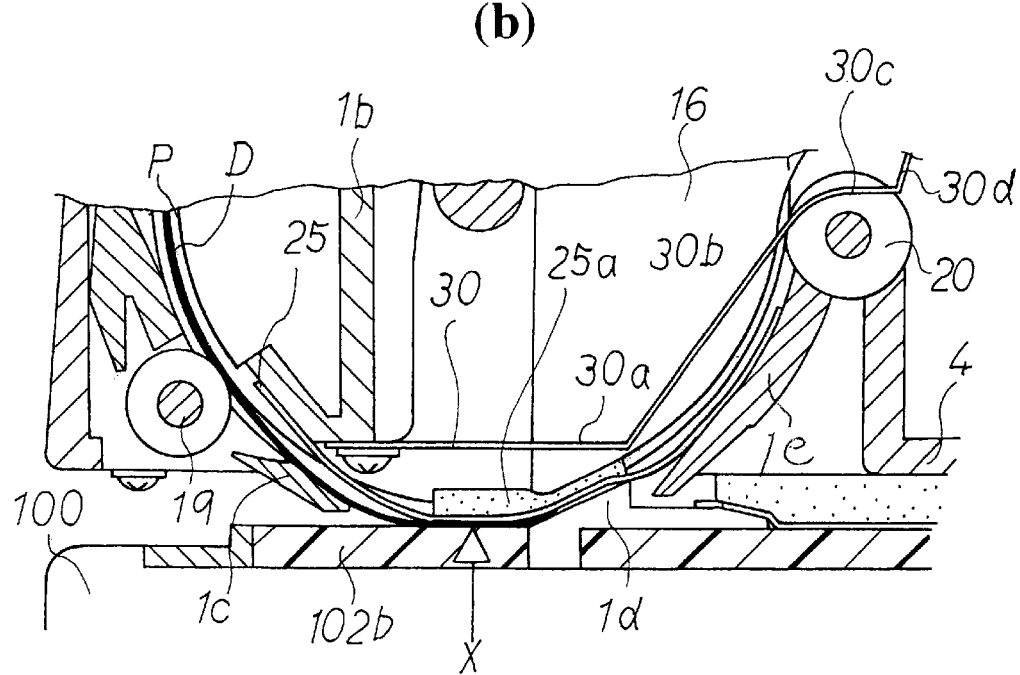

In such a consecutive document reading process as described above, a document sheet D being moved in the conveying path P by the resisting roller 18 and the feed roller 19 is fed onto the reading position X on the platen 102b as being guided by the Mylar member 25 and the guide 1c as shown in FIG. 3(a) by providing the Mylar member 25 having said composition. And as shown in FIG. 3(b), a document sheet read at this position is conveyed to the discharge roller 20 as being pressed against the pickup guide 1d by an elastic force of the free portion of the Mylar member 25.

As a result, since a document sheet D which is fed to the reading position X and then passes the reading position X and is conveyed to the pickup guide 1d is pressed by the free portion of the Mylar member 25 during a consecutive conveying operation of passing the reading position X, the document sheet is not flapped up and down and therefore an image read at the reading position is not distorted. Particularly, since a document sheet D is conveyed as being closely pressed against the pickup guide 1d in the curved part of the pickup guide 1d as shown in FIG. 3(b), the document sheet D is surely prevented from flapping up and down at the reading position X and therefore an image is not distorted even by being scanned by such a scanning means as a contact image sensor.

And since the free end portion of the Mylar member 25 is inserted into the conveying path formed in the ADF by the large-diameter roller 16 and the paper discharge guide 1e, when the ADF is opened the free end of the Mylar member 25 is prevented by the paper discharge guide 1e from springing out downward.

Said Mylar member 25 may be composed so as to press a part in the direction of width of a conveyed document sheet, but it is preferable to be made broad in width so as to press the whole document sheet. That is to say, it is preferable that the Mylar member 25 is made wider than the width of the maximum document sheet to be processed by the ADF. By making it wider in such a way, it is possible to surely prevent a read image from being distorted in the direction of width.

And it is preferable to interpose such an elastic member as a sponge 25a between the Mylar member 25 and the frame so that the Mylar member 25 itself becomes parallel with the curved part in the pickup guide 1d. By interposing such an elastic member, it is possible to more effectively press and stabilize a document sheet D in the curved part. Such an elastic member may be formed out of a spring and the like instead of a sponge.

Furthermore, by providing such a plate spring 30 as described above, the following effects can be further obtained in addition to the above effects.

Figure 4:
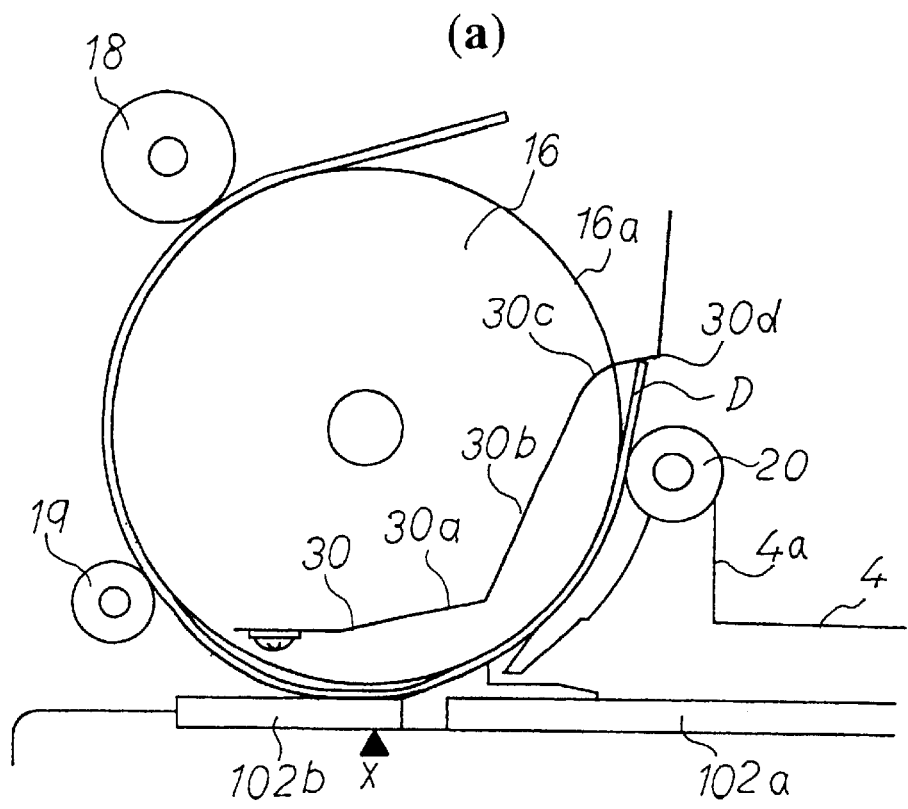
FIG. 4 including (a) and (b) shows states of discharging a document sheet at discharge points in order.
Figure 4:
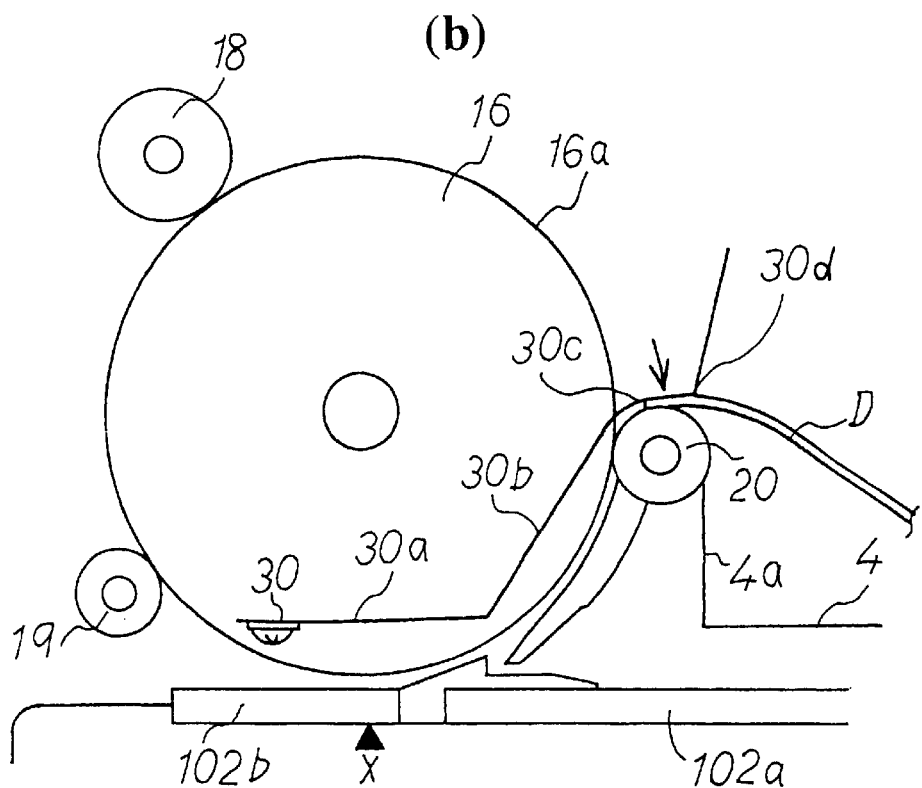

As shown in FIG. 4, the fore end of a document sheet D being read at the reading position X is conveyed along the outer circumferential face of the large-diameter roller 16 and then strikes the inclined portion 30b at an acute angle. Due to this striking, the fore end of the document sheet turns the plate spring 30 in the direction of an arrow as rising along the inclined portion 30b. At this time, since the fore end of a document sheet is guided upward as being in contact with the inclined portion 30b at an acute angle, the document sheet D is conveyed stably and the accuracy of reading at the reading position X is improved.

And as shown in FIG. 4(a), after the fore end of a document sheet is moved from the inclined portion 30b to the curved portion 30c, the fore end of the document sheet is slipped out from the curved portion 30c and is deflected toward the paper discharge stacker 4 as being controlled by the bent portion 30d bent upward.

And after the fore end of the document sheet is moved from the inclined portion 30b to the curved portion 30c, the fore end of the document sheet is slipped out from the curved portion 30c and is deflected toward the paper discharge stacker 4 as being controlled by the bent portion bent upward.

And as shown in FIG. 4(b) finally, the rear end of the document sheet is pressed by a downward energizing force by the curved portion 30c and, as it is, the document sheet is discharged onto the paper discharge stacker 4 like dropping. Therefore, the rear end of a discharged document sheet is not left on the paper discharge roller 20 but is arranged at the rear end stop portion 4a side of the paper discharge stacker 4 to be stable in discharged position. And in this case, by supporting the paper discharge roller 20 so that its outer circumferential face projects from the rear end stop portion 4a, it is possible to surely discharge a document sheet without jamming it.

And according to the composition of such a plate spring 30 as described above, since the fore end of a document sheet is guided as being in contact with the inclined portion 30b at an acute angle, the document sheet D is stably conveyed and the accuracy of reading at the reading position X can be improved. Further, by performing guidance in such a way, a paper discharge point (nipping part of the large-diameter roller 16 and the paper discharge roller 20) can be made higher, and thereby it is possible to make the paper discharge stacker 4 larger in capacity and discharge a larger number of document sheets.

An embodiment of an automatic document feeder of the present invention has been described above but the present invention can be modified and varied variously in addition to the above-mentioned embodiment.

In said embodiment a document sheet drawn out from the paper feed stacker 2 is guided along the curved conveying path P provided by the outer circumferential face of the large-diameter roller 16, but the position of arrangement of a paper feed stacker, the composition of a document conveying path or conveying points and the like can be variously modified.

And they may be composed of a conveying means using a pair of rollers, an endless belt and the like being separately from one another. And a curved conveying path may be a path curved over the respective conveying points other than a path made along the outer circumferential face of a large-diameter roller.

And a document deflecting means may not be arranged all over the large-diameter rollers axially provided, but the shape, the position of arrangement and the like of it may be variously modified even if it can deflect a document sheet discharged from the third conveying point toward a paper discharge stacker 4.

And a pressing piece for pressing a conveyed document sheet against a pickup guide may be formed out of, for example, a hanging piece supported so as to hang down from the frame toward the pickup guide in place of a Mylar member.

Figure 5:
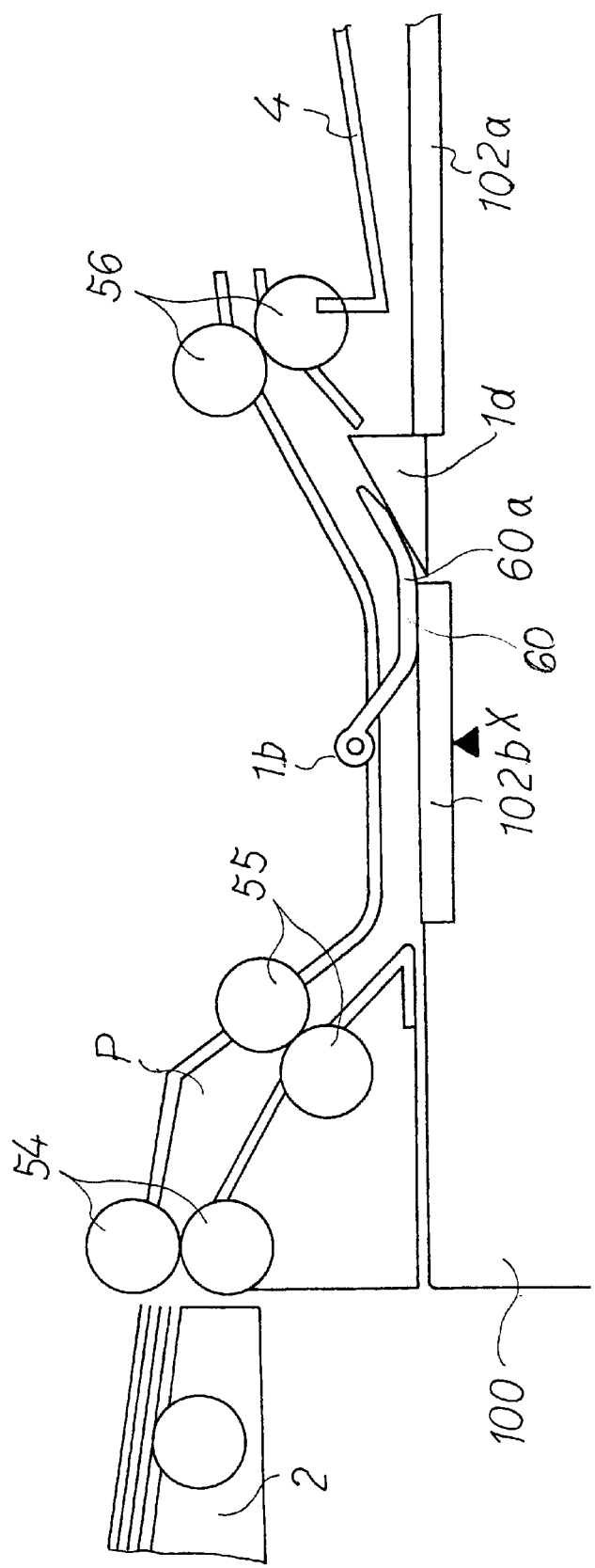
FIG. 5 shows another embodiment of an automatic document feeder according to the present invention.

FIG. 5 is a schematic view showing another embodiment of such an automatic document feeder. In this embodiment, a document sheet drawn out from a paper feed stacker 2 is conveyed onto a platen 102b by a pair of conveying rollers 54 and 55. A frame 1b over the platen 102b supports a hanging piece 60 which extends from the reading position X to the downstream side and hangs toward a pickup guide 1d. This hanging piece 60 is shaped so that its fore end portion 60a becomes parallel with the pickup guide 1d.

Since a document sheet passing the reading position X and being conveyed to the pickup guide 1d is effectively pressed also by such a hanging piece 60 in the curved part at the time of a consecutive conveying operation of passing the reading position X, the document sheet is not flapped up and down and an image read at the reading position is not distorted. It is a matter of course that in such a composition also, the accuracy of reading can be improved by providing an elastic member such as a sponge and the like or providing a plate spring similarly to such a composition as described above.

And a document read at the reading position X is discharged through a paper discharge roller 56 onto a paper discharge stacker 4.

Figure 6:
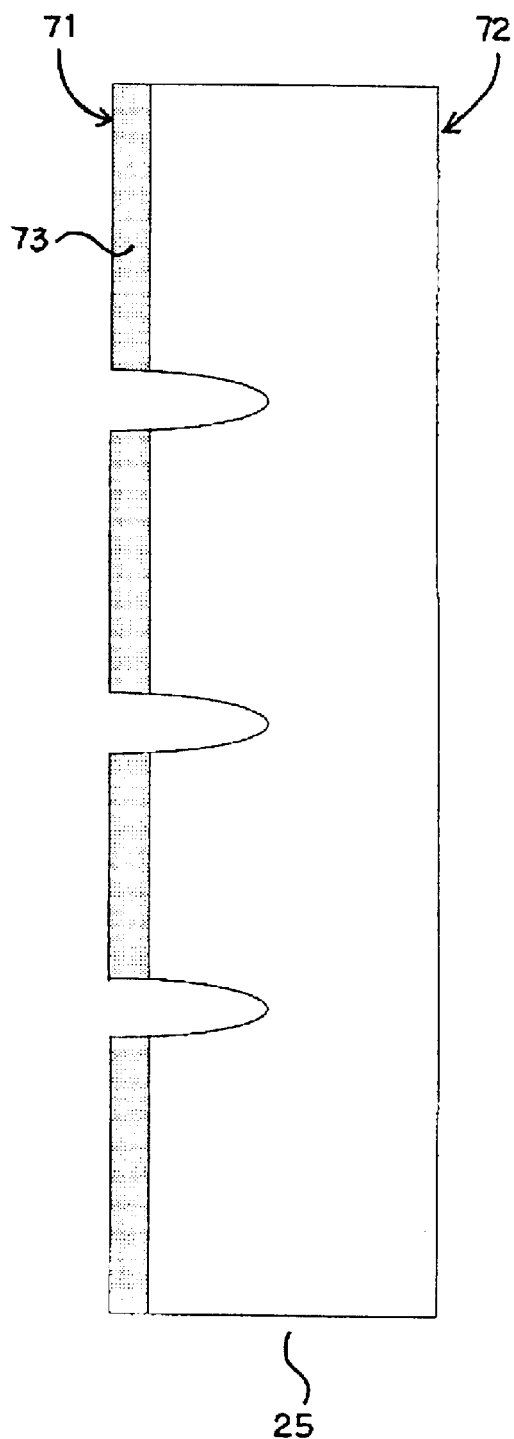
FIG. 6 shows an example of a pressing piece forming an automatic document feeder according to the present invention.

FIG. 6 shows an example of a pressing piece to form an automatic document feeder according to the present invention.

As described above in detail, a pressing piece 25 is fixed at the upstream side 71 of a document reading position and is formed so as to extend from the fixed position across the document reading position to the downstream side 72 in a free state. The pressing piece 25 is detachably attached to a frame forming the automatic document feeder or a module guide 75 (FIG. 7) forming a document sheet conveying path in conjunction with said conveying roller. For this purpose, a double-faced adhesive tape or Velcro (Magic Tape) 73 is adhered to said upstream end portion 71 of the pressing piece 25, and thereby the said pressing piece 25 can be attached to and detached from said frame or module guide 75. The pressing piece 25 is made of a white Mylar member and made wider in width than the maximum document sheet to be conveyed.

Figure 7:
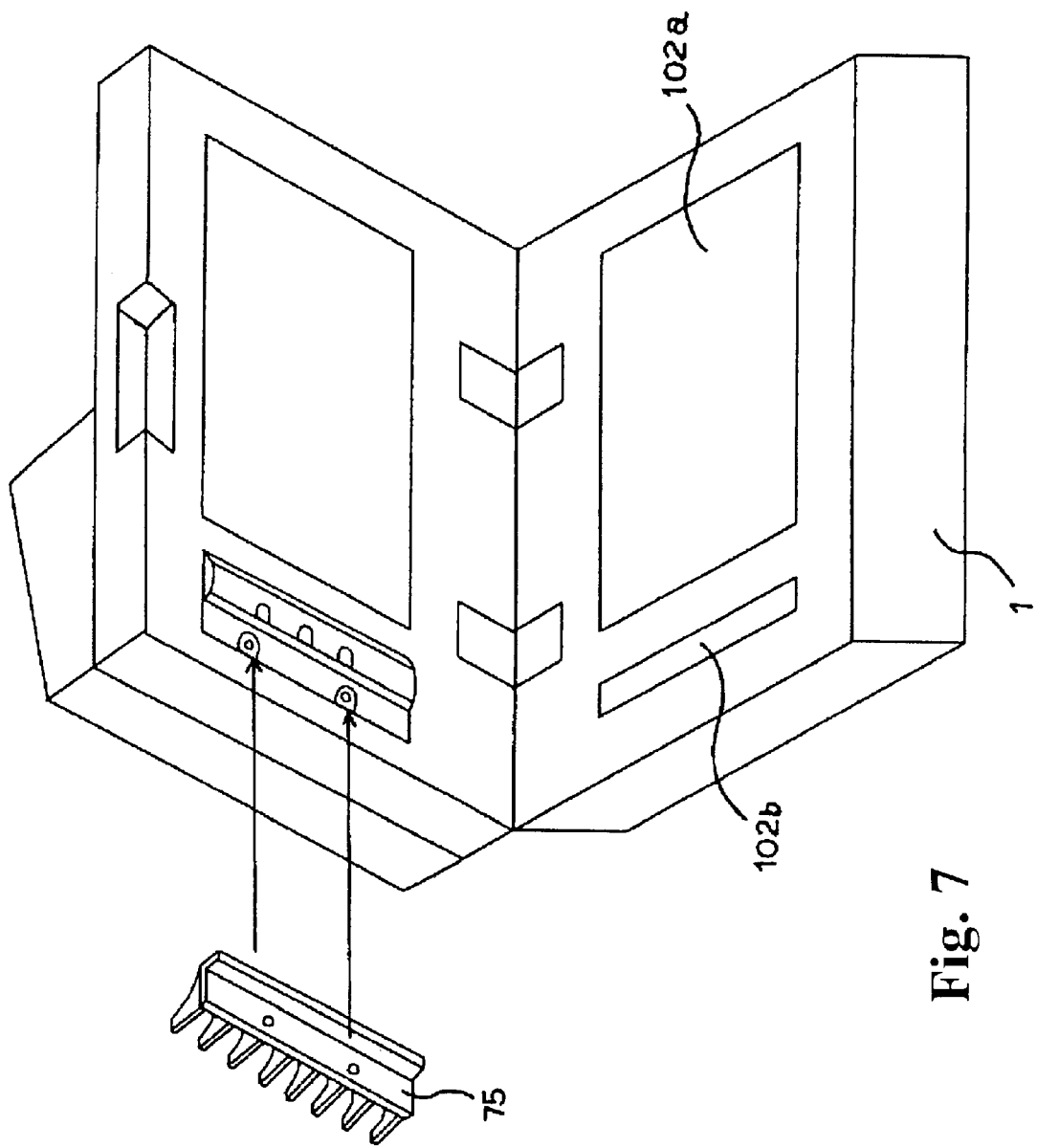
FIG. 7 shows a state of detachably attaching a first pressing piece.

FIG. 7 shows a state where a first pressing piece is detachably attached. In this example, a module guide 75 forming a document sheet conveying path in conjunction with a conveying roller is attached to the frame by screw or the like. And the pressing piece 25 is detachably attached to the said module guide 75 by means of a double-faced adhesive tape 73 or a Velcro.

Further, another embodiment related to detachable attachment of a pressing piece in the present invention is shown.

Figure 8:
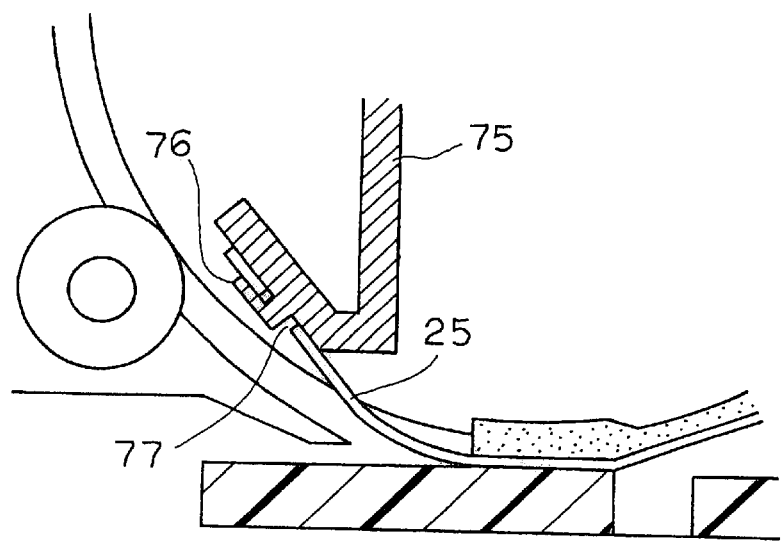
FIG. 8 shows a state of detachably attaching a second pressing piece.

FIG. 8 shows a state where a second pressing piece is detachably attached. This is a view showing an example of attachment of a module guide 75 and a pressing piece 25.

This shows a state where the pressing piece 25 is attached by engaging a hook-shaped projection 76 formed on the module guide 75 with a fitting hole 77 formed in the pressing piece 25 when attaching. When detaching, the pressing piece 25 is detached from the module guide 75 by disengaging the projection of the module guide 75 and the fitting hole 77 of the pressing piece 25 from each other through pressing the pressing piece 25 to the upstream side in the document conveying direction.

Figure 9:
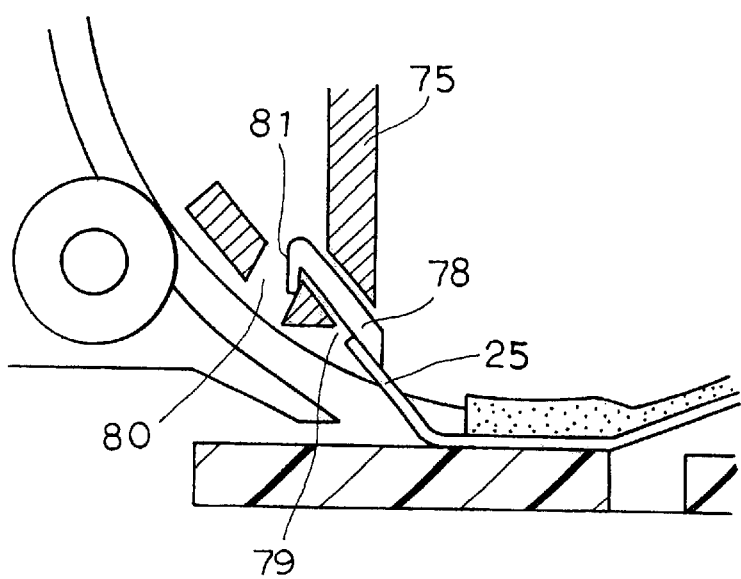
FIG. 9 shows a state of detachably attaching a third pressing piece.

FIG. 9 shows a state where a third pressing piece is detachably attached. This shows an example of attaching the pressing piece 25 to an attaching member 78 having a pawl 81 formed on it and engaging the pawl 81 of the attaching member 78 and the engaging hole 80 formed in the module guide 75 with each other.

This embodiment adheres a pressing piece 25 to an attaching member with a double-faced adhesive tape or the like, and inserts a pawl 81 formed at the fore end of the attaching member 78 into an engaging hole 80 formed in a module guide 75. When inserted, the pawl 81 formed at the fore end of the attaching member 78 is engaged with the engaging hole 80 formed in the module guide 75 and thereby the pressing piece 25 is attached to the module guide 75 through the attaching member 78. When detaching, this embodiment presses the pawl 81 of the attaching member 78 with such a tool as a screwdriver or the like and draws the attaching member 78 toward the downstream side in the document conveying direction and thereby detaches it from the module guide 75.

As described above, according to an automatic document feeder of the present invention, since the flapping of a document sheet at a reading position is surely suppressed when the document sheet is conveyed to the reading position of an image reader, it is possible to surely prevent an image read in the image reader from being distorted and prevent a document sheet from being jammed.

Furthermore, according to a composition of the present invention, the composition of a driving system is simplified and the whole automatic document feeder can be made small-sized and the reading speed can be improved when document sheets are consecutively read. And since a document sheet read by the document sheet reading portion is discharged in a stable state by a deflecting means, it is not necessary also to make a paper discharger stacker large-sized.

What is claimed is:

1. An automatic document feeder with a conveying roller for conveying a document sheet to a document reading position on a platen facing a document image reading portion, comprising:
    a pickup guide adjoining said platen for picking up a fore end of the document sheet scanned at said document reading position and for conducting said document sheet downstream of said document reading position; and
    a pressing piece in contact with said platen and said pickup guide for pressing the scanned document sheet passed through said document reading portion against said pickup guide at a curved path from said platen, to said pickup guide.

2. The automatic document feeder according to claim 1, wherein said pressing piece is fixed at an upstream side of said document reading position, extending from said fixed position across the document reading position wherein a downstream end portion of said pressing piece is made free.

3. The automatic document feeder according to claim 1, wherein the upstream end portion of said pressing piece is fixed at said document reading position and the downstream end portion extends from said fixed position across the document reading position and is free in a hanging state.

4. The automatic document feeder according to claim 2 or 3, wherein said pressing piece is made of a white plastic material.

5. The automatic document feeder according to claim 4, wherein said pressing piece is made wider in width than a width of the maximum document sheet to be conveyed.

6. The automatic document feeder according to claim 5, further comprising an elastic member so as to make said pressing piece parallel with said curved part.

7. The automatic document feeder according to claim 6, wherein said elastic member is formed out of one of a sponge material and a spring material.

8. The automatic document feeder according to one of claims 1 to 3, wherein said pressing piece is detachably attached to one of a frame forming the automatic document feeder and a module guide forming a document sheet conveying path in conjunction with said conveying roller.

9. The automatic document feeder according to claim 8, wherein a double-faced adhesive tape is adhered to said upstream end portion of said pressing piece thereby making said pressing piece detachably attached to one of said frame and said module guide.

10. An automatic document feeder with a conveying roller for conveying a document sheet to a document reading position on a platen facing a document image reading portion, comprising:
    a pickup guide for picking up a fore end of the document sheet scanned at said document reading position from said platen;
    a paper discharge means for discharging a document sheet passing said platen onto a paper discharge stacker; and
    a curved path being located where said document reading portion reads the conveyed document sheet;
    wherein said paper discharge means is provided with a paper discharge roller and a document sheet deflecting means with a swayable plate spring for deflecting a the document sheet toward the paper discharge stacker.

11. The automatic document feeder according to claim 10, wherein said paper discharge means has a paper discharge roller and said document sheet deflecting means is a swayable plate spring.

12. The automatic document feeder according to claim 11, wherein said plate spring is formed so that one of its end portion in a paper discharging direction is curved following a circumferential face of said paper discharge roller.

13. The automatic document feeder according to claim 11, wherein said plate spring is being arranged to be struck by the fore of the conveyed document sheet at an acute angle.

14. The automatic document feeder according to claim 13, wherein said plate spring guides the fore end of the conveyed document sheet in a state where the fore end of the document sheet is in contact with said plate spring at an acute angle at a nipping part of the paper discharge roller.

15. The automatic document feeder according to either claims 11 or 12, wherein said paper discharge roller is supported so that one of its outer circumferential face projects from a rear end stop plate of said paper discharge stacker.

16. An image reader, comprising:
    a paper feed stacker and a paper discharge stacker provided at an upper and a lower positions relative to each other;
    a curved path which is arranged between the paper feed stacker and the paper discharge stacker through which a document sheet is conveyed;
    a paper feed means formed in a path for conveying the document sheet;
    a conveying means for feeding the document sheet to a document sheet reading portion;
    a paper discharge means;
    a driving motor for driving the conveying means and the paper discharge means for conveying the document sheet to said image reader;
    a document sheet discharge means with a paper discharge roller for discharging the document sheet read by said document sheet reading portion onto said paper discharge stacker; and
    a document sheet deflecting means with a swayable plate spring for deflecting the document sheet toward the paper discharge stacker.

17. The image reader according to claim 16, wherein said paper feed means is provided with a resisting roller for removing a skew of the document sheet fed from said paper feed stacker;

said conveying means is provided with a feed roller for feeding the document sheet whose skew has been removed to the document sheet reading portion; and said paper discharge means is provided with a paper discharge roller for discharging the document sheet read by the document sheet reading portion onto the paper discharge stacker.

18. The image reader according to claim 17, wherein said resisting roller, said feed roller and said paper discharge roller are in contact with an outer circumferential face of a single large-diameter roller.

19. An automatic document feeder with a conveying roller for conveying a document sheet, to a document reading position on a platen facing a document image reading portion, comprising:

a pickup guide adjoining said platen for picking up a fore end of the document sheet scanned at said document reading position from said platen;

a document sheet discharge means for discharging the document sheet passing said platen onto a paper discharge stacker;

a pressing piece in contact with said platen and said pickup guide for pressing the document sheet passed through said document reading portion against said pickup guide at a curved path from said platen to said pickup guide;

a document sheet deflecting means for making said paper discharge roller discharge the document sheet onto the paper discharge stacker and deflecting a the document sheet toward the paper discharge stacker; and a document sheet deflecting means for deflecting the document sheet toward the paper discharge stacker.

\* \* \* \* \*